US007418134B2

(12) United States Patent
Schwartz et al.

(10) Patent No.: US 7,418,134 B2
(45) Date of Patent: Aug. 26, 2008

(54) METHOD AND APPARATUS FOR FOREGROUND SEGMENTATION OF VIDEO SEQUENCES

(75) Inventors: Stuart Schwartz, Princeton, NJ (US); Juhua Zhu, Princeton, NJ (US); Bede Liu, Princeton, NJ (US)

(73) Assignee: Princeton University, Princeton, NJ (US)

( * ) Notice: Subject to any disclaimer, the term of this patent is extended or adjusted under 35 U.S.C. 154(b) by 712 days.

(21) Appl. No.: 10/843,953

(22) Filed: May 12, 2004

(65) Prior Publication Data

US 2004/0228530 A1 Nov. 18, 2004

Related U.S. Application Data

(60) Provisional application No. 60/525,288, filed on Nov. 26, 2003, provisional application No. 60/469,743, filed on May 12, 2003.

(51) Int. Cl.
G06K 9/34 (2006.01)
G06K 9/36 (2006.01)
H04N 11/02 (2006.01)

(52) U.S. Cl. .................. 382/173; 382/236; 382/239; 382/250; 375/240.08; 375/240.2

(58) Field of Classification Search ............ 382/103, 382/173, 236, 239, 243, 248, 250; 375/240.08, 375/240.18, 240.2
See application file for complete search history.

(56) References Cited

U.S. PATENT DOCUMENTS 5,608,458 A 3/1997 Chen et al. ............. 348/413

(Continued)

OTHER PUBLICATIONS

Lamarre et al. Background Subtraction Using Competing Models in the Block-DCT Domain. Proceedings, 16th International Conference on Pattern Recognition. Aug. 2002, vol. 1, pp. 299-302.*

(Continued)

*Primary Examiner*—Colin LaRose
(74) *Attorney, Agent, or Firm*—Mathews, Shepherd, McKay & Bruneau, P. A.

(57) ABSTRACT

The present invention relates to a method and system for foreground segmentation in which frames of a video sequence are analyzed in the transform domain to determine one or more features. The features are used to model the background. The background can be modeled as a single Gaussian model with a mean and variance of the features. A current frame is segmented by determining if one or more features of the current frame analyzed in the foreground domain satisfy a threshold between the background model. The threshold value can be based on the mean and/or variance of features. During the segmentation, the mean and variance can be updated based on previous corresponding values and current features to adaptively update the background model. In one embodiment, the frames are divided into a plurality of blocks. A transform is used to analyze the blocks in the transform domain. For example, the transform can be a discrete cosine transform (DCT). The features can be a DC feature comprising the DC coefficient and an AC feature comprising a weighted sum of the AC coefficients. The weighted sum is determined with weights which are varied to emphasize different aspects of the present invention. Additional processing steps can be used to remove false positives, handle sudden global illumination changes, handle sudden local illumination changes and remove false negatives.

50 Claims, 13 Drawing Sheets

U.S. PATENT DOCUMENTS

| | | | |
|---|---|---|---|
| 6,195,458 | B1 | 2/2001 | Warnick et al. ............. 382/173 |
| 6,337,917 | B1 | 1/2002 | Onural et al. ............... 382/107 |
| 6,473,522 | B1 | 10/2002 | Lienhart et al. ............. 382/168 |
| 6,600,786 | B1 | 7/2003 | Prakash et al. ......... 375/240.25 |
| 6,625,310 | B2 | 9/2003 | Lipton et al. ................ 382/173 |
| 6,628,710 | B1 | 9/2003 | Llach-Pinsach et al. 375/240.08 |
| 7,239,748 | B2 * | 7/2007 | Prakash ...................... 382/173 |

OTHER PUBLICATIONS

Elgammal et al. Background and Foreground Modeling Using Nonparametric Kernel Density Estimation for Visual Survellance. Proceedings of the IEEE. Jul. 2002, vol. 90, Issue 7, pp. 1151-1163.*

Girgensohn et al. Video Classification Using Transform Coefficients. Proceedings, 1999 IEEE International Conference on Acoustics, Speech, and Signal Processing. Mar. 1999, vol. 6, pp. 3045-3048.*

Naohiro, Amamoto, and Akihiro Fujii, "Detecting Obstructions and Tracking Moving Objects by Image Processing Technique", Electronics and Communications in Japan, Part 3, vol. 82, No. 11, 1999, pp. 28-37.

Vasudev Bhaskaran et al, Image and Video Compression Standards (Algorithms and Architectures), Kluwer Academic Publishers, 1995, pp. 66.

M. Cristiani, M. Bicego, and V. Murino, "Integrated Region-and Pixel-based Approach to Background Modeling," IEEE Workshop on Motion and Video Computing, Dec. 2002, pp. 3-8.

Richard O. Duda et al., Pattern Classification (2nd edition), John Wiley & Sons, Inc., 2001, p. 88-89.

O. Javed, K. Shafique, and M. Shah, "A Hierarchial Approach to Robust Background Subtraction using Color and Graient Information," Pro. Workshop on Motion and Video Computing, 2002, pp. 22-27.

P. Kaew TraKulPong, and R. Bowden, "An Improved Adaptive Background Mixture Model for Real-time Tracking with Shadow Detectoin," 2nd European Workshop on Advanced Video Based Surveillance Systems (AVBS01), Sep. 2001.

Mathieu Lamarre, and James J. Clark, "Backgound subtraction using competing models in the block-DCT domain." ICPR 2002, pp. 299-302.

L.Li, and M. Leung, "Integrating Intensity and Texture Differences for Robust Change Detection," IEEE Trans. on Image Processing, vol. 11, No. 2, pp. 105-112, 2002.

C. Ridder, O. Munkelt, et al, "Adaptive Background Estimation and Foreground Detection using Kalman-filtering," Proc. of Intl. Conf. On Recent Advances in Mechatronics (ICRAM), pp. 193-199, 1995.

C. Stauffer, and W.E.L. Grimson, "Adaptive Background Mixture Models for Real-time Tracking," CVPR 1999, pp. 246-252.

B. Stenger, V. Remesh, et al., "Topology Free Hidden Markov Models: Application to Background Modeling," ICCV 2001, pp. 294-310.

K. Toyama, J. Krunmm, et al., "Wallflower: Principles and Practice of Background Maintenance," ICCV 1999, pp. 255-261.

* cited by examiner

FIG. 2 (training)

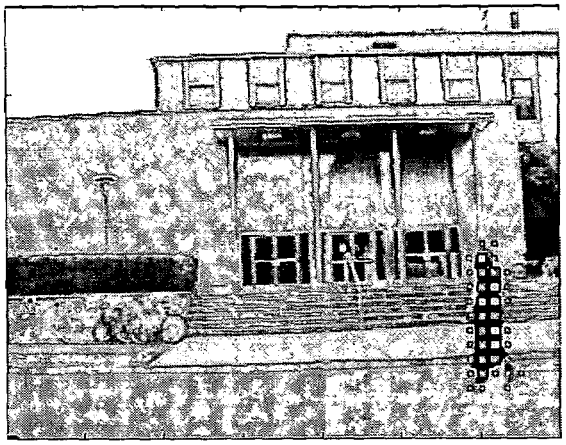
Fig. 8A. Frame 69
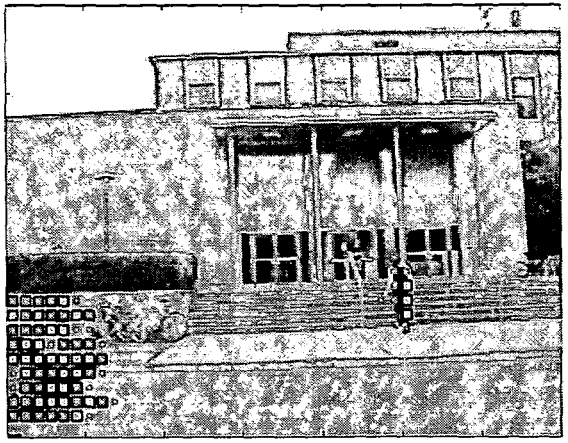
Fig. 8B. Frame 97
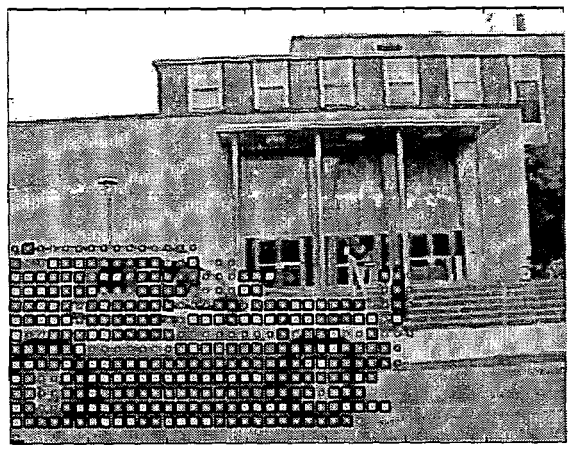
Fig. 8C. Frame 99
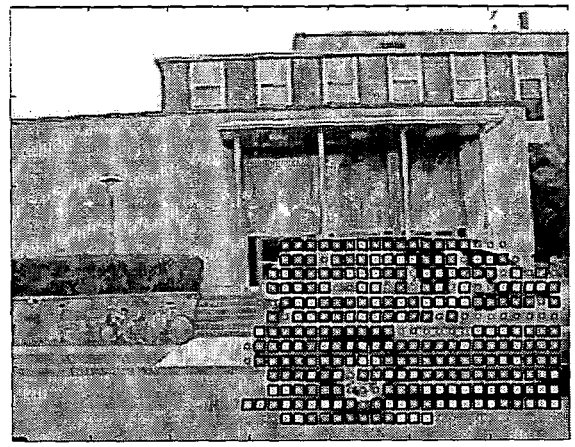
Fig. 8D. Frame 101
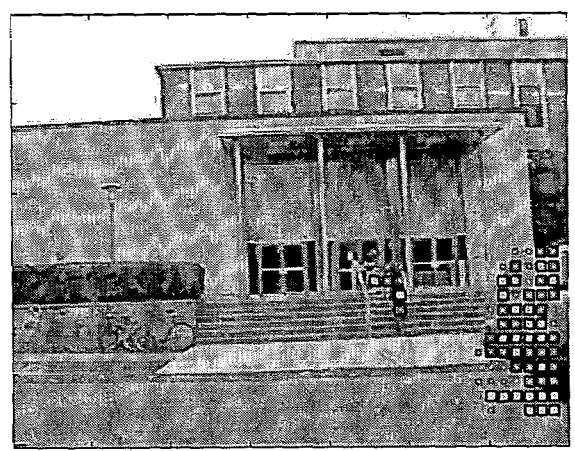
Fig. 8E. Frame 103
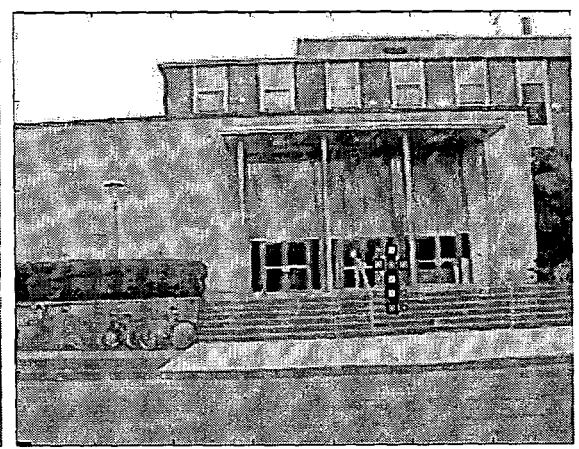
Fig. 8F. Frame 111

Fig. 9A. Frame 23
Fig. 9B. Frame 33
Fig. 9C. Frame 43
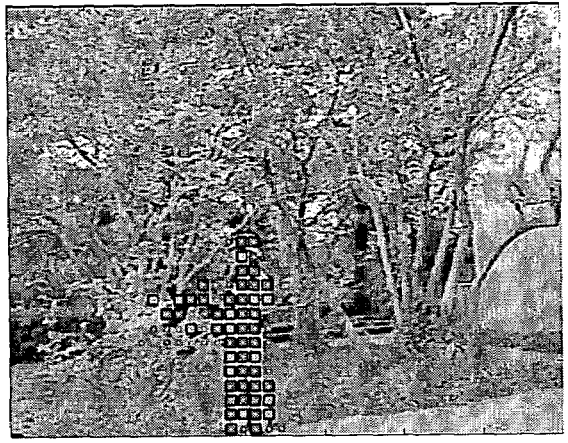
Fig. 9D. Frame 53
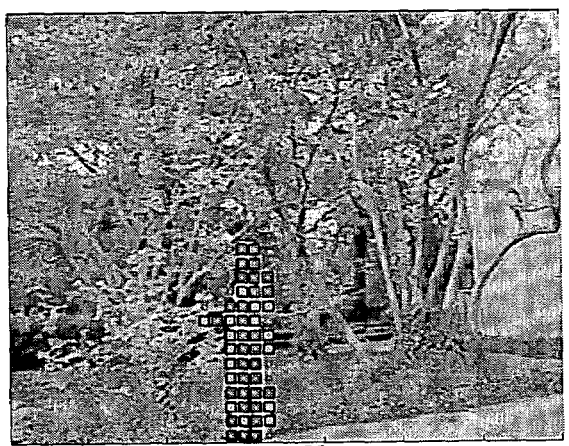
Fig. 9E. Frame 55
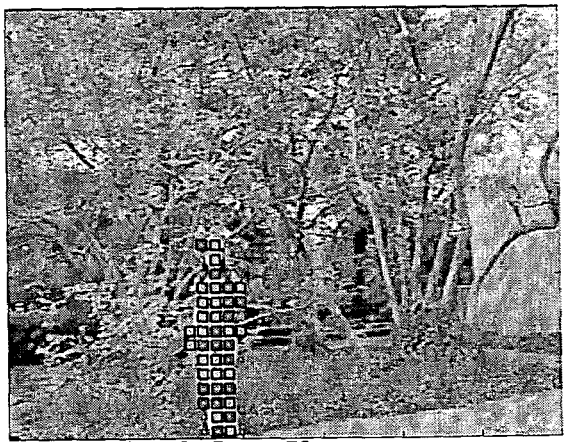
Fig. 9F. Frame 79

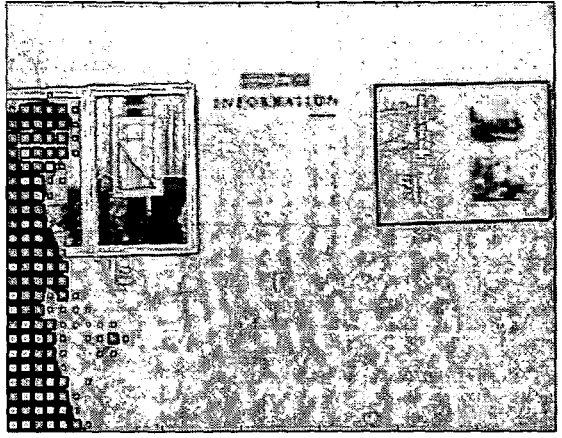
Fig. 10A. Frame 31
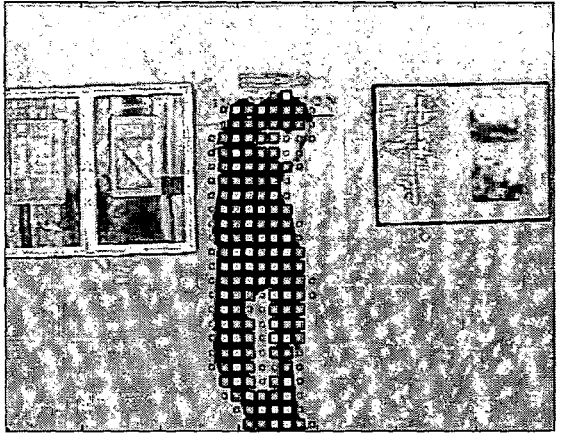
Fig. 10B. Frame 35
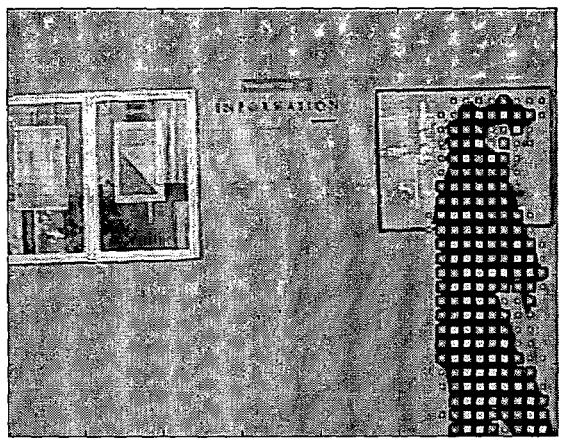
Fig. 10C. Frame 39
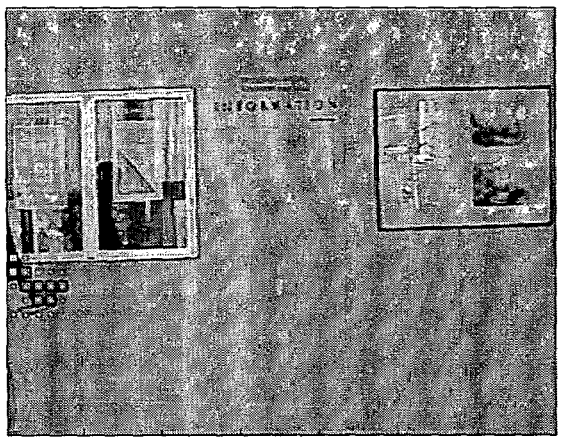
Fig. 10D. Frame 66
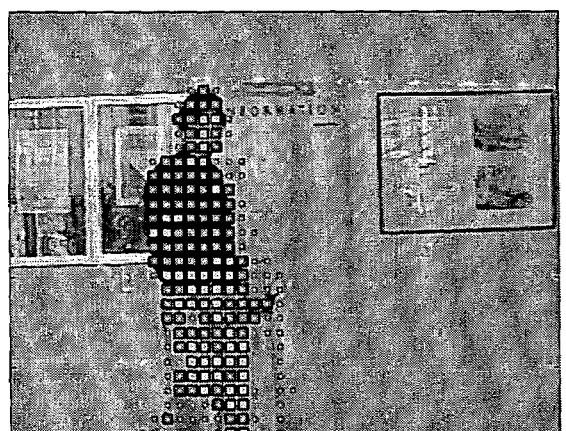
Fig. 10E. Frame 73
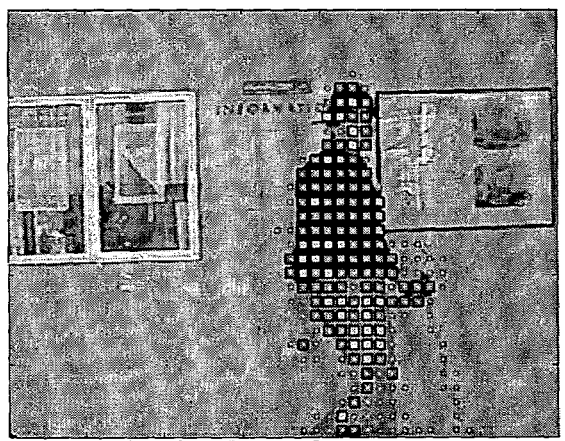
Fig. 10F. Frame 78

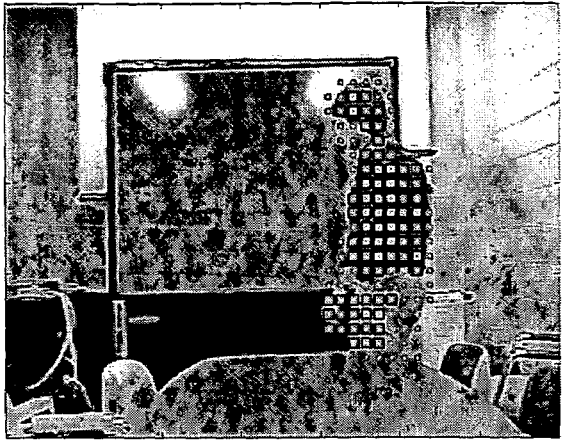
Fig. 11A. Frame 34
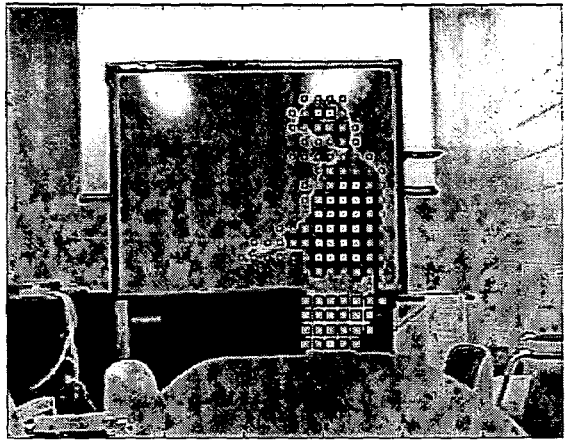
Fig. 11B. Frame 41
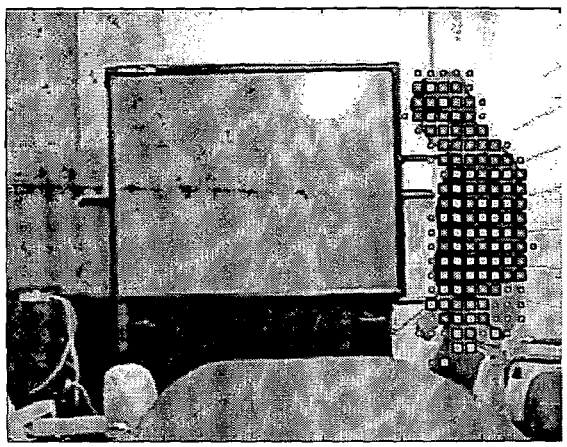
Fig. 11C. Frame 80
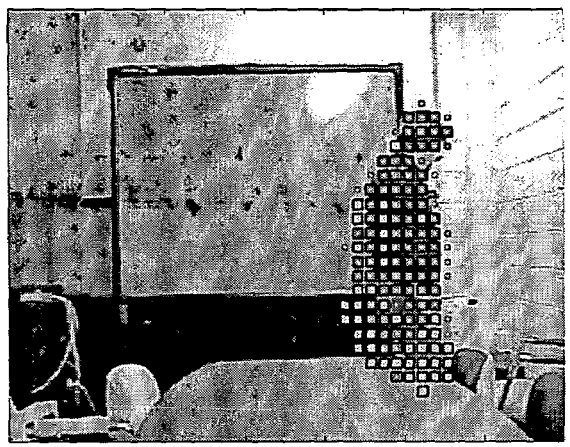
Fig. 11D. Frame 124
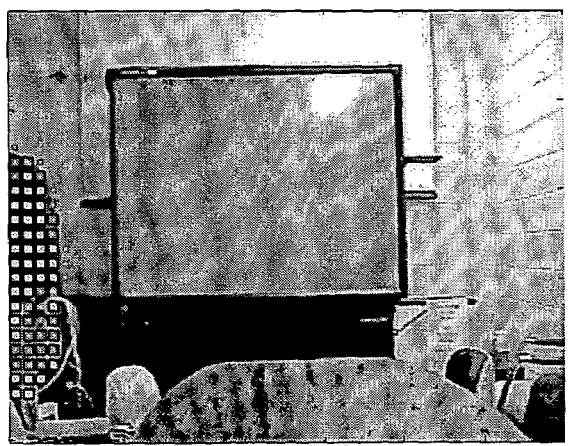
Fig. 11E. Frame 152
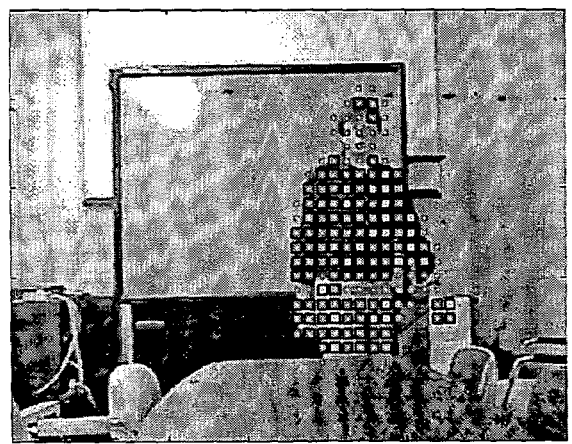
Fig. 11F. Frame 193

METHOD AND APPARATUS FOR FOREGROUND SEGMENTATION OF VIDEO SEQUENCES

CROSS REFERENCE TO RELATED APPLICATION

This application claims the benefit of U.S. Provisional Patent Application No. 60/469,743, filed May 12, 2003, and U.S. Provisional Patent Application No. 60/525,288, filed Nov. 26, 2003, the entirety of each U.S. Provisional Patent Application is hereby incorporated by reference into this application.

BACKGROUND OF THE INVENTION

1. Field of the Invention

The present invention relates to a method and apparatus for foreground segmentation of video sequences using features derived in the transform domain to adaptively model the background and to perform segmentation based on the difference of the features of the current frame from that of the background model. The present invention can be used, for example, in video surveillance and in video encoding.

2. Description of Related Art

The task of foreground segmentation of video sequences is to label the regions in an image as moving objects or as background. It is the fundamental step in many vision systems including video surveillance and human-machine interface. And it is useful in low-bandwidth telecommunications. Accurate segmentation is difficult due to such factors as illumination variation, occlusion, background movements, and noise. The challenges facing the segmentation task include: illumination variation due to gradual or sudden change, and global or local change; background change due to moved background objects, and small repetitive movements such as swaying trees, and flickering screen; foreground aperture due to the difficulty in detecting interior motion of an object with homogeneous color; bootstrapping when background frames for training are not available; camouflage when the foreground is very similar to the background; and shadows cast by the foreground objects. In addition, a complex segmentation algorithm may be difficult to implement for real time operation.

Many approaches have been proposed to segment the foreground moving objects in video sequences. Information of the temporal evolution of pixel values is commonly used. Typically a new frame is subtracted from a reference image and then a threshold is applied to the difference. These approaches differ in the type of background model used and the procedure used to update the model. A comprehensive comparison can be found in K. Toyama, J. Krunmm, et al., Wallflower: Principles and Practice of Background Maintenance, ICCV99, 1999, 255-261.

To make the algorithm robust to a change in illumination or to the background, adaptive background modeling approaches have been proposed. Kalman Filtering based methods are robust to lighting changes in the scene. See, C. Ridder, O. Munkelt, et al., Adaptive Background Estimation and Foreground Detection using Kalman-filtering, Proc. of Intl. Conf. On Recent Advances in Mechatronics (ICRAM), 1995, 193-199. But these approaches recover slowly and do not handle bimodal backgrounds well. A Mixture of Gaussians (MoG) model has been proposed in C. Stauffer, and W. E. L. Grimson, Adaptive Background Mixture Models for Real-time Tracking, CVPR99, 1999, 246-252. This model adapts slowly to a sudden lighting change. Attempts have been made to try to improve the MoG algorithm. See, M. Cristani, M. Bicego, and V. Murino, Integrated Region- and Pixel-based Approach to Background Modeling, IEEE Workshop on Motion and Video Computing, Dec. 2002, 3-8, and P. KaewTraKulPong, and R. Bowden, An Improved Adaptive Background Mixture Model for Real-time Tracking with Shadow Detection, Proc. $2^{nd}$ European Workshop on Advanced Video Based Surveillance Systems (AVBS01), September 2001. A Hidden Markov Model has been used to describe global state changes. See B. Stenger, V. Remesh, et al., "Topology Free Hidden Markov Models: Application to Background Modeling," ICCV 2001, pp. 294-310. In another attempt, a Wallflower system is proposed that attempts to solve many of the common problems with background maintenance. See, K. Toyama, J. Krunmm, et al., Wallflower: Principles and Practice of Background Maintenance, ICCV99, 1999, 255-261.

All of the above-described algorithms use the intensity or color information of the pixels. However, the intensity/color based background systems are susceptible to sudden lighting changes. Efforts have been made to incorporate other illumination-robust features for scene modeling. In one attempt, the intensity and texture information is integrated to perform change detection, with the texture-based decision taken over a small neighborhood. See, L. Li, and M. K. H. Leung, Integrating Intensity and Texture Differences for Robust Change Detection, IEEE Trans. on Image Processing, Vol. 11, No. 2, February 2002, 105-112. Another attempt uses the fusion of color and gradient information. See, O. Javed, K. Shafique, and M. Shah, A Hierarchial Approach to Robust Background Subtraction using Color and Gradient Information, Proc. Workshop on Motion and Video Computing, 2002, 22-27. The computation is intensive and may not be suitable for real-time implementation.

Two papers use DCT domain processing for background subtraction and detecting obstructions and tracking moving objects. M. Lamarre and J. J. Clark do background subtraction in the block-DCT domain. ("Background subtraction using competing models in the block-DCT domain." ICPR2002). The authors use different methods for smooth and sudden transitions scenarios in the background subtraction algorithm. Smooth transitions of the DC coefficients are integrated into the background model with a steady state Kalman filter and sudden changes are detected and analyzed by the Hidden Markov Models (HMM). These models are computed using multiple competing HMMs over small neighborhoods. Background and transition matrix probabilities are estimated empirically. N. Amamoto and A. Fujii extract the moving vehicle by thresholding the mean value of the midband and high AC components of the DCT of the background difference image, and combining this with the predicted object region based on the previous object region and motion vector in "Detecting Obstructions and Tracking Moving Objects byImage Processing Technique," Electron. And Comm. In Japan, Part 3, Vol. 82, No. 11, 1999, pp. 28-37.

It is desirable to provide an improved method for foreground segmentation of video sequences which is robust to illumination variation and changing background, and also easy to implement for real time applications.

SUMMARY OF THE INVENTION

The present invention relates to a method and system for foreground segmentation in which frames of a video sequence are analyzed in the transform domain to determine one or more features. The features are used to model the background. The background can be modeled as a Gaussian model with a mean and variance of the features. A current frame is segmented by determining if one or more features of certain blocks in the current frame deviate sufficiently from those of the corresponding blocks in the background model. The test for sufficient deviation is by using a threshold value based on the mean and/or variance of the features. During the segmentation, the background model can be updated by updating its mean and variance based on previous corresponding values and current features. In one embodiment, the frames are divided into a plurality of blocks, and the blocks are analyzed in the transform domain to extract features. For example, the transform can be a discrete cosine transform (DCT) of the luminance component. The features can be a DC feature comprising the DC coefficient and an AC feature comprising a weighted sum of the AC coefficients. The weighted sum employs weights which can be varied to emphasize different aspects of the present invention. Additional processing steps can be used to reduce false positives and false negatives, to handle sudden global illumination changes, and to handle sudden local illumination changes.

It has been found that there are many advantages of using the above described features. By using a block-based approach, some local information is taken into consideration for segmentation. The use of blocks also makes the algorithm insensitive to noise and to tiny scene changes. An additional benefit of using features derived from blocks instead of pixel values is that the computation is considerably reduced, at least by one order of magnitude.

The invention will be more fully described by reference to the following drawings.

BRIEF DESCRIPTION OF THE DRAWINGS

FIGS. 8A-8F are frames of a video sequence of a car and people in an outdoor setting.

FIGS. 9A-9F are frames of a video sequence of a background of trees, swaying branches and a person.

FIGS. 10A-10F are frames of a video sequence of an indoor scene with highly reflective background, strong shadows and camouflage.

FIGS. 11A-11F are frames of a video sequence of an indoor scene with mirror-like background parts and severe lighting change.

DETAILED DESCRIPTION

Figure 1:
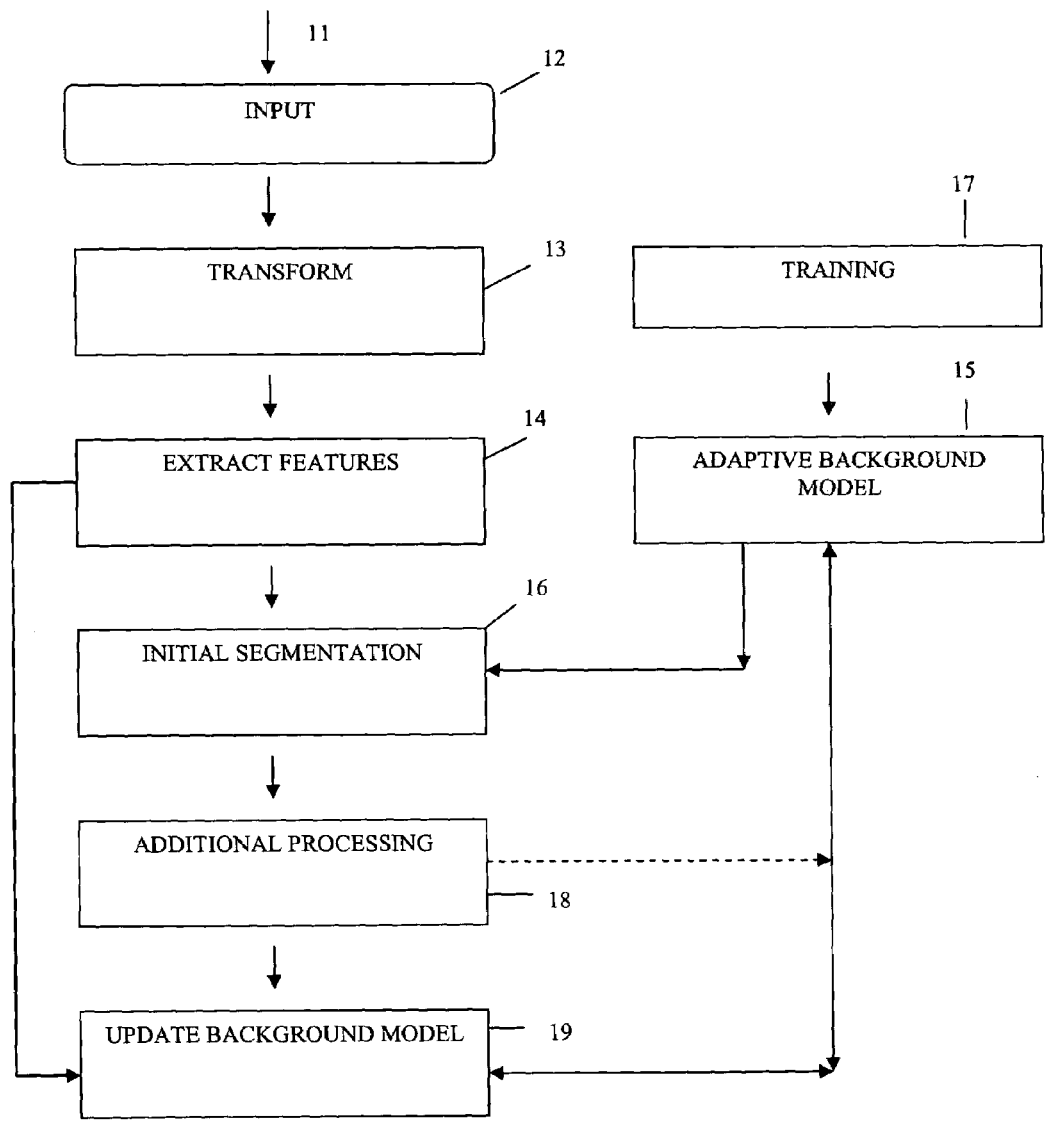
FIG. 1 is a flow diagram of a method for foreground segmentation of video sequences in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a block diagram of a method for foreground segmentation of video sequences 10 in accordance with the teachings of the present invention. A video sequence as used herein is defined as a temporally ordered sequence of individual digital images which may be generated directly from a digital source, such as a digital electronic camera or graphic arts application on a computer, or may be produced by the digital conversion (digitization) of the visual portion of analog signals, such as those produced by television broadcast or recorded medium, or may be produced by the digital conversion (digitization) of motion picture film. In block 12, frame 11 of a video sequence is received. Each frame can be divided into overlapping or non-overlapping blocks. For example, the block size can be 8×8. A frame as used herein is defined as the smallest temporal unit of a video sequence to be represented as a single image.

In block 13, blocks of each frame 11 are converted from the spatial domain to the transform domain, resulting in an array of transform coefficients. A suitable transform which can be used is a discrete cosine transform (DCT). See, Vasudev Bhaskaran et al., Image and Video Compression Standards (Algorithms and Architectures), Kluwer Academic Publishers, 1995, p. 66. The DCT coefficients may be readily available or easily extractable from video compressed by the popular standards such as Motion JPEG (joint photographic expert group) or MPEG (moving pictures expert group). Alternatively, other spatial domain to transform domain transforms can be used such as wavelet transform, discrete sine transform (DST), and Fourier transform.

In block 14, features are determined from the transform. For example, the features can be determined from transform coefficients. In one embodiment, two features are extracted from DCT coefficients of the luminance component of each block. In this disclosure, DCT(i, j) denotes the DCT coefficient in $i^{th}$ row and $j^{th}$ column in a block. A first feature referred to as a DC feature, represented by $f_{DC}$, is the DC coefficient which can be defined as $$f_{DC}=DCT(0,0).$$

A second feature referred to as an AC feature, represented by $f_{AC}$, is a weighted sum of the DCT coefficients. The weighted sum of DCT coefficients can be represented as $$f_{AC} = \sum_{i=0}^{m} \sum_{j=0}^{n} w(i, j) \cdot |DCT(i, j)|.$$

In one embodiment, m=n=3, and $w(i, j)=(i^2+j^2)$. This choice de-emphasizes the very low frequency and the high frequency coefficients. The reason for de-emphasizing the very low frequency components is that they often correspond to smooth transition of intensity, and would therefore lead to detecting shadows as part of the foreground object. The reason for de-emphasizing the high frequency coefficients is that they relate more to fine details that are more susceptible to illumination changes. The high frequency coefficients are also affected more by random noise.

It will be appreciated that alternative weighting schemes can be used to determine the AC feature. For example, a weight of (i+j) could be used to make the AC feature more sensitive to shadows, whereas a uniform weight could be used to make the AC feature less sensitive to blurred edges. Accordingly, the weights can be varied to emphasize different aspects and features of the video sequence.

Referring to FIG. 1, an adaptive background model is determined, in block 15. The adaptive background model can be a Gaussian distribution. In one embodiment, for each block, it is assumed that the DC and AC feature are independent and follow the Gaussian distribution with means $\mu_{AC}$, and $\mu_{DC}$, and variances $\sigma^2_{AC}$ and $\sigma^2_{DC}$, respectively.

The initial values of the means and variances can be estimated from training in block 17 on a number of frames without moving foreground objects, and these values are updated in block 19 as described later.

Figure 2:
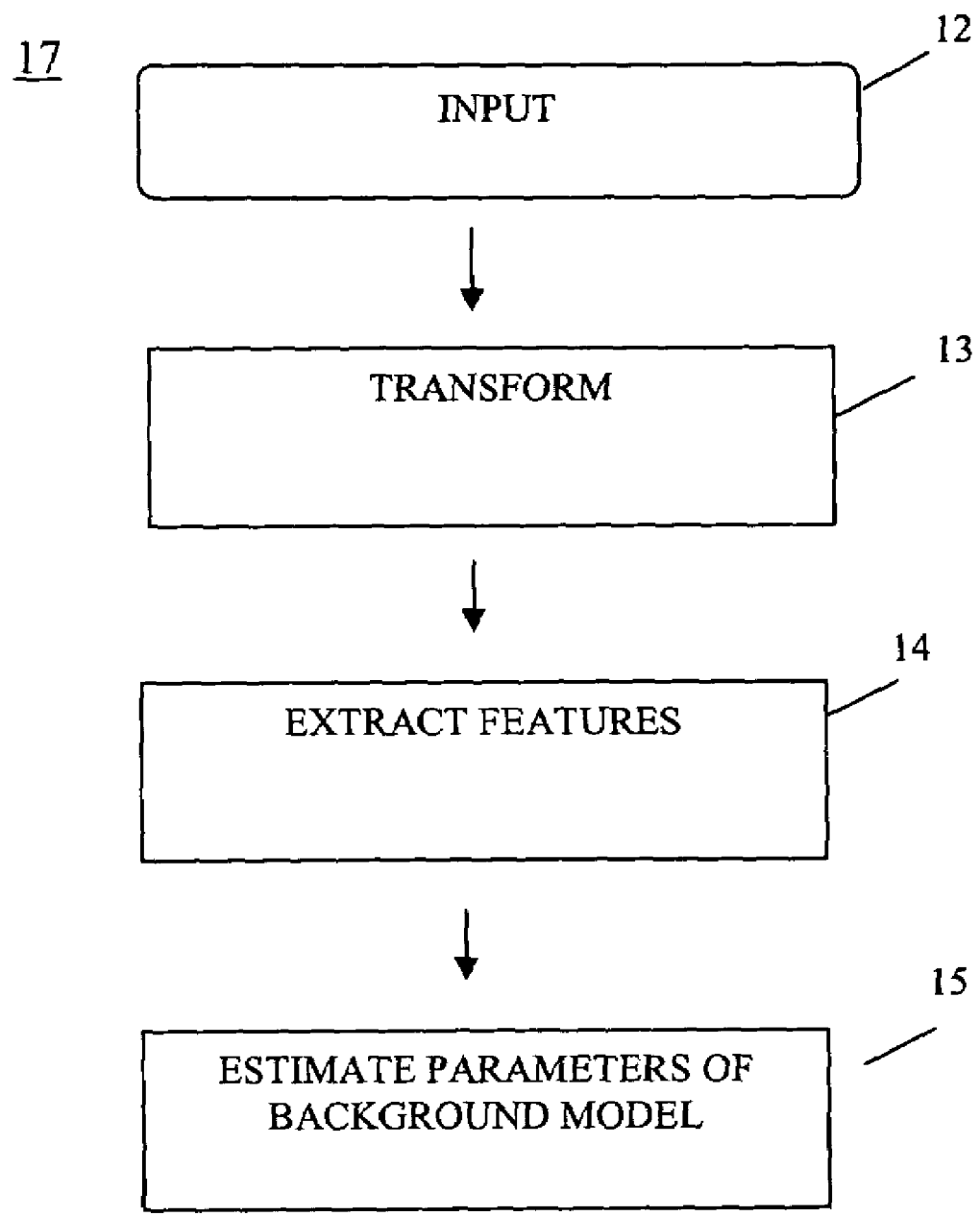
FIG. 2 is a flow diagram of a method for training for the background model.

FIG. 2 illustrates an embodiment of block 17 for background model training. Blocks 12-14 are as described above. In block 15, the parameters of the background model are estimated based on the features extracted from a training sequence. For example, the training sequence can comprise one or more training frames without foreground objects. In one embodiment, if Gaussian distribution is employed to model the randomness of the temporal evolution of each AC and DC feature in the background, Maximum Likelihood Estimation, see Richard O. Duda et al., Pattern Classification ($2^{nd}$ edition), John Wiley & Sons, Inc. 2001, p. 88-89, can be utilized to estimate the parameters necessary and sufficient to a specific Gaussian distribution, mean $\mu$ and variance $\sigma^2$.

In block 16, an initial segmentation of the current frame is obtained, a block is classified as foreground, if, for that block, $$|f_{AC} - \mu_{AC}| > T_{AC} \quad (*)$$

or $$|f_{DC} - \mu_{DC}| > T_{DC} \quad (**)$$

where $T_{AC}$ and $T_{DC}$ are the thresholds. The blocks satisfying the $T_{AC}$ threshold are referred to as "AC foreground blocks." The blocks satisfying the $T_{DC}$ threshold are referred to as "DC foreground blocks." Typically, a foreground object will have both of the AC foreground blocks and the DC foreground blocks. Equation (*) reflects that the presence of an edge of foreground objects and different texture between the foreground and the background will lead to the detection of a foreground block due to a large difference between the current AC value and the AC value in the background model. Equation (**) reflects an intensity difference between the background and the moving foreground objects as a large difference between the current DC value and the DC in the background model, thus the corresponding block will be classified as belonging to the foreground. Accordingly, combining the two criteria is equivalent to using both information of intensity and texture, thereby providing robust and effective segmentation.

In one embodiment, the thresholds $T_{AC}$ and $T_{DC}$ in equations (*) and (**) are:

$$T_{AC} = \mu_{AC}/4 + 4 \times \sigma_{AC}$$

$$T_{DC} = \mu_{DC}/4 + 4 \times \sigma_{DC}$$

This choice for the thresholds provides tolerance in terms of a variation in the mean values. In an alternate embodiment, a somewhat lower threshold can be used.

When there is no frame without moving objects available for background model training purposes, such as a busy street scene, the feature value in a first or a previous frame 11 can be used as a training frame for determining the initial mean value of the Gaussian distribution for the background model training. Additionally, the variance of the Gaussian distribution can be used for background model training. In this case, the standard deviation is unavailable to be used in the thresholds described above for the time being and needs to be estimated with a few consecutive frames. In the segmentation step of block 16, the thresholds are set initially as $$T_{AC} = \mu_{AC}/1.5$$

$$T_{DC} = \mu_{DC}/2.$$

It has been found that typically about 10 to about 20 frames are sufficient to provide a good estimate of the standard deviation. Once a number of frames have been processed and the mean and variance are estimated, the previous pair of thresholds can replace the latter pair.

In block 18, additional processing such as size filtering, illumination change detection and handling and filling are used to achieve better performance, as described below. Some of these processing are targeted at situations with abrupt and severe illumination changes. Some are to reduce sporadic false positives determined during segmentation.

In block 19, after the segmentation of the current frame, the model for the background can be updated for the segmentation of the next frame. The updating can be described by the following equations:

$$\mu_t = (1-\alpha_\mu)\mu_{t-1} + \alpha_\mu \cdot x$$

$$\sigma_t^2 = (1-\alpha_\sigma)\sigma_{t-1}^2 + \alpha_\sigma \cdot (x-\mu_t)^2,$$

where t and t−1 are the frame numbers, x represents either the AC feature or the DC feature, and a is $\alpha$ learning parameter controlling the learning speed. In the updating, a smaller learning parameter leads to slower but more stable adaptation and helps to reduce the effect of outliers.

Figure 3:
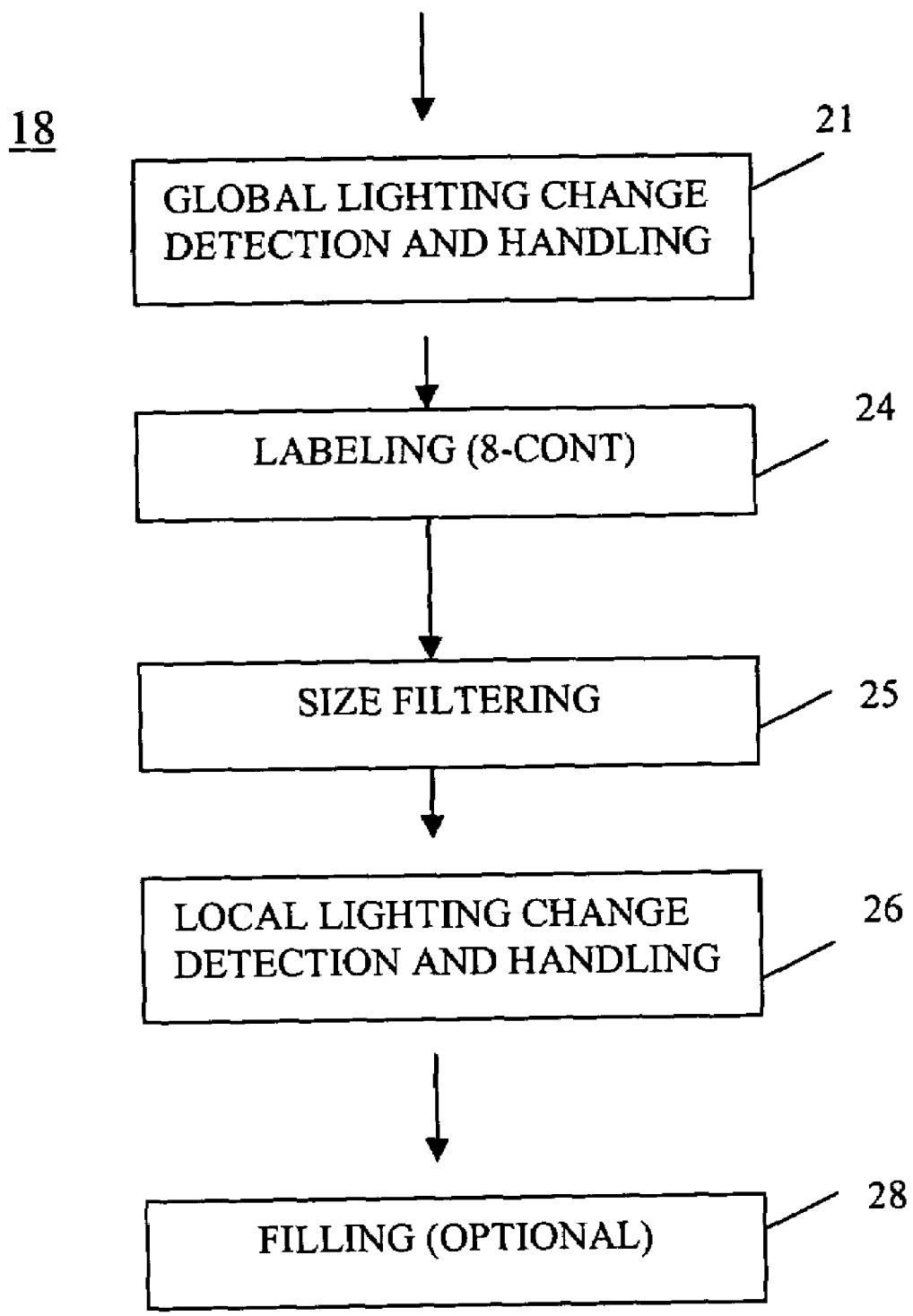
FIG. 3 is a flow diagram of a method for additional processing.

FIG. 3 illustrates an embodiment of block 18 for additional processing. After initial segmentation, additional processing steps can be used to improve the segmentation accuracy, for example, size filtering can be used to reduce false positives, filling can be used to reduce false negatives, and some other heuristics can be employed to handle sudden illumination changes.

In block 21, sudden global illumination change is detected and handled.

Figure 4:
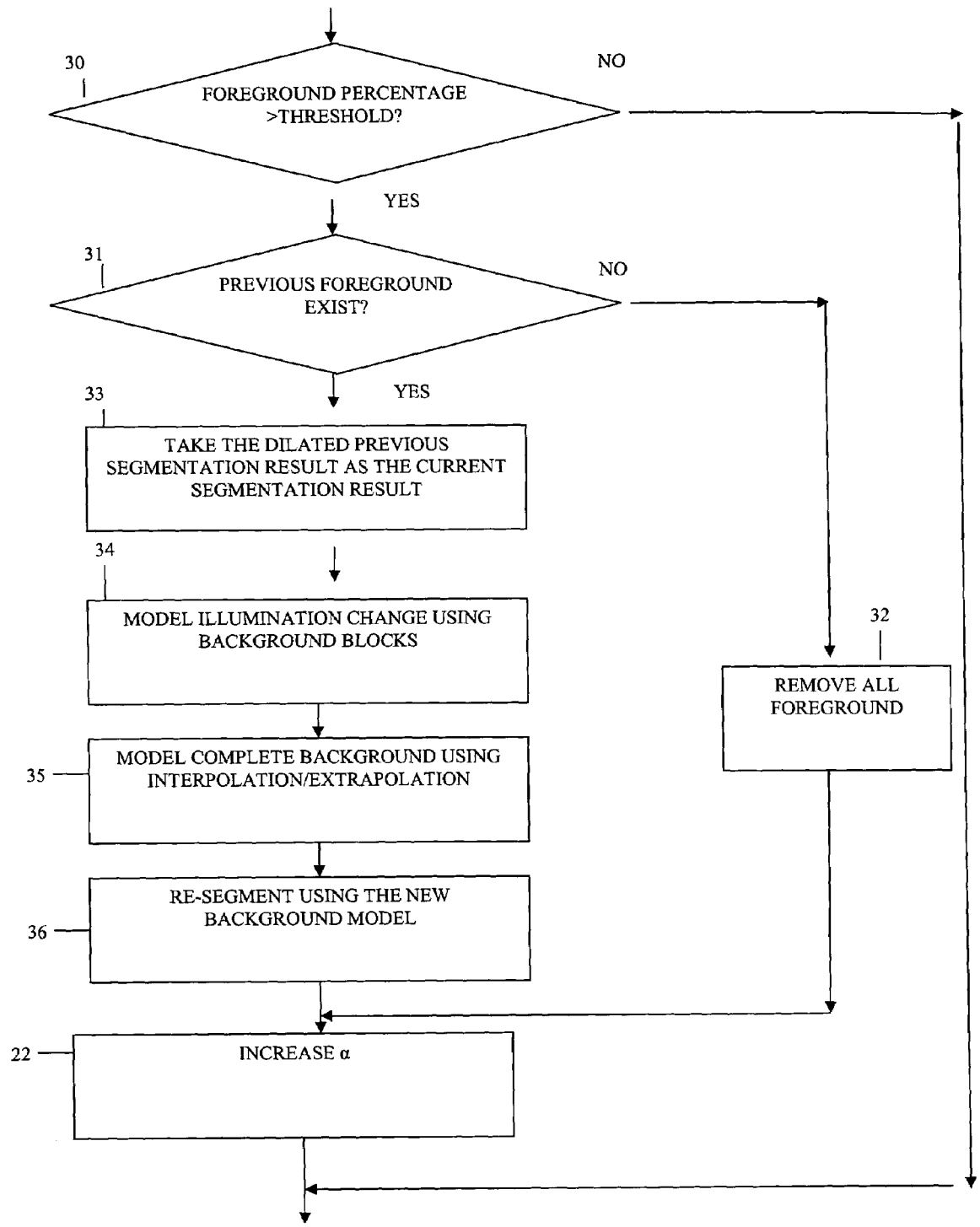
FIG. 4 is a flow diagram of a method for handling sudden global illumination changes.

FIG. 4 illustrates a method for implementing block 21 for handling sudden global illumination changes. In block 30, it is determined if there is a global illumination change which can result in a sudden and significant increase of the number of the foreground blocks. A global change can be detected if one or more of the following criteria are satisfied: (1) if the detected foreground is larger than a certain fraction of the whole scene; (2) a large area is suddenly detected as foreground that heretofore belonged to the background in the previous frames; and (3) the size of an object exceeds a certain fraction of the area of the whole scene. The threshold values used to detect the global illumination change should be based on the frame rate of the video sequence and the scene under consideration. In block 31, it is determined if foreground was detected in the previous frame. If it is determined that no previous foreground objects are found in the previous segmentation result, block 32 is performed to remove all foreground objects and block 22 is performed for increasing the value of the training variable $\alpha$. If it is determined that some foreground objects were found in the previous segmentation result, block 33 is performed to use the dilated previous segmentation result as the current segmentation result. In one embodiment, dilation adds pixels to the boundaries of objects in an image. The number of pixels added from the objects in an image depends on the size and shape of the structuring element used to process the image. Typically, two-dimensional, or flat, structuring elements comprise a matrix of 0s and 1s, typically much smaller than the image being processed. The center pixel of the structuring element, called the origin, identifies the pixel of interest, i.e., the pixel being processed. The pixels in the structuring element containing 1s define the neighborhood of the structuring element. These pixels are also considered in dilation processing. For example, in a dilation process of the present invention, if the structuring element used is a 3×3 matrix containing all 1s, then for any block, among whose 3×3 neighborhood there is at least one foreground block, this block is also marked as a foreground block.

Then illumination changes are modeled for the background blocks other than the dilated previous foreground region in block 34. In block 35, the complete background is modeled. Usually the illumination change is smooth across the scene which indicates that the difference between the current frame and the existing background varies slowly across the scene. Hence, the complete background can be modeled by estimating the difference between the current frame and the frame of the background model using interpolation/extrapolation of the available difference map corresponding to non-object blocks. After the up-to-date background is obtained, re-segmentation can be performed using the updated background model, in block 36. After the re-modeling of the background and/or re-segmentation is accomplished, the learning parameter α is increased in block 22, thereby making the adaptation to the new background faster.

Referring to FIG. 3, if it is determined that there is not a global illumination change, connected component labeling can be performed in block 24. In one embodiment, 8-connected component labeling can be used. Ideally, all the blocks that belong to the same object will share the same label. As the assignment of the labels at this stage, known as index labeling as opposed to semantic labeling, is not necessarily accurate, the labeled blocks are often referred to with the less descriptive term of "blobs".

Figure 5:
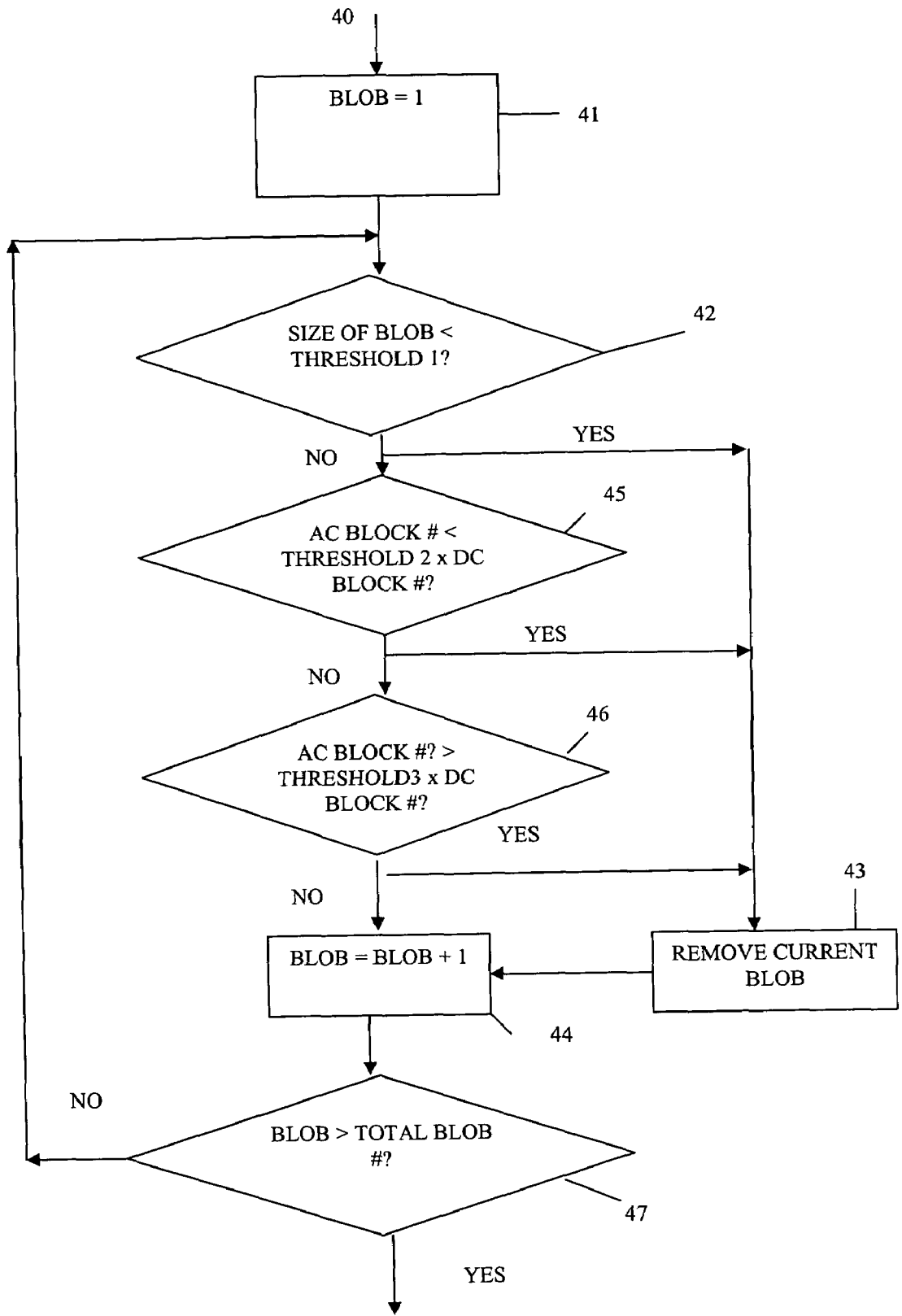
FIG. 5 is a flow diagram of a method for size filtering.

In block 25, size filtering is applied to each separate blob in order to remove false positives from the determined segmentation result. FIG. 5 illustrates an implementation of a method for size filtering. The method starts with the first blob, as indicated by block 40. In block 41, it is determined if the blob size is less than a predetermined first threshold value. If the blob size is less than the predetermined first threshold value, the current blob is removed in block 43 and the blob counter is updated by 1, in block 44.

If the size of the blob is greater than the first threshold value, it is determined if the ratio of the number of AC blocks to the number of DC blocks is less than a predetermined second threshold value, in block 45. If the ratio of the number of AC blocks to the number of DC blocks is less than the second threshold value, the current blob is removed in block 43 and the blob counter is updated by 1, in block 44. If the ratio of the number of AC blocks to the number of DC blocks is not smaller than the second threshold value, block 46 is used to determine if the ratio of the number of DC blocks to the number of AC blocks is less than a predetermined third threshold value. If a ratio of the number of DC blocks to the number of AC blocks is less than the third threshold value, the current blob is removed in block 43 and the blob counter is updated by 1, in block 44. If the ratio of the number of DC blocks to the number of AC blocks is not less than the third threshold value, the blob counter is updated by 1, in block 44. Block 47 is used to determine if all the detected blobs have been processed. Blocks 42-46 are repeated until all the blobs are size-filtered.

Referring to FIG. 3, block 26 is implemented to determine if there has been a local illumination change or moved background object, and then handle it if there is.

Figure 6:
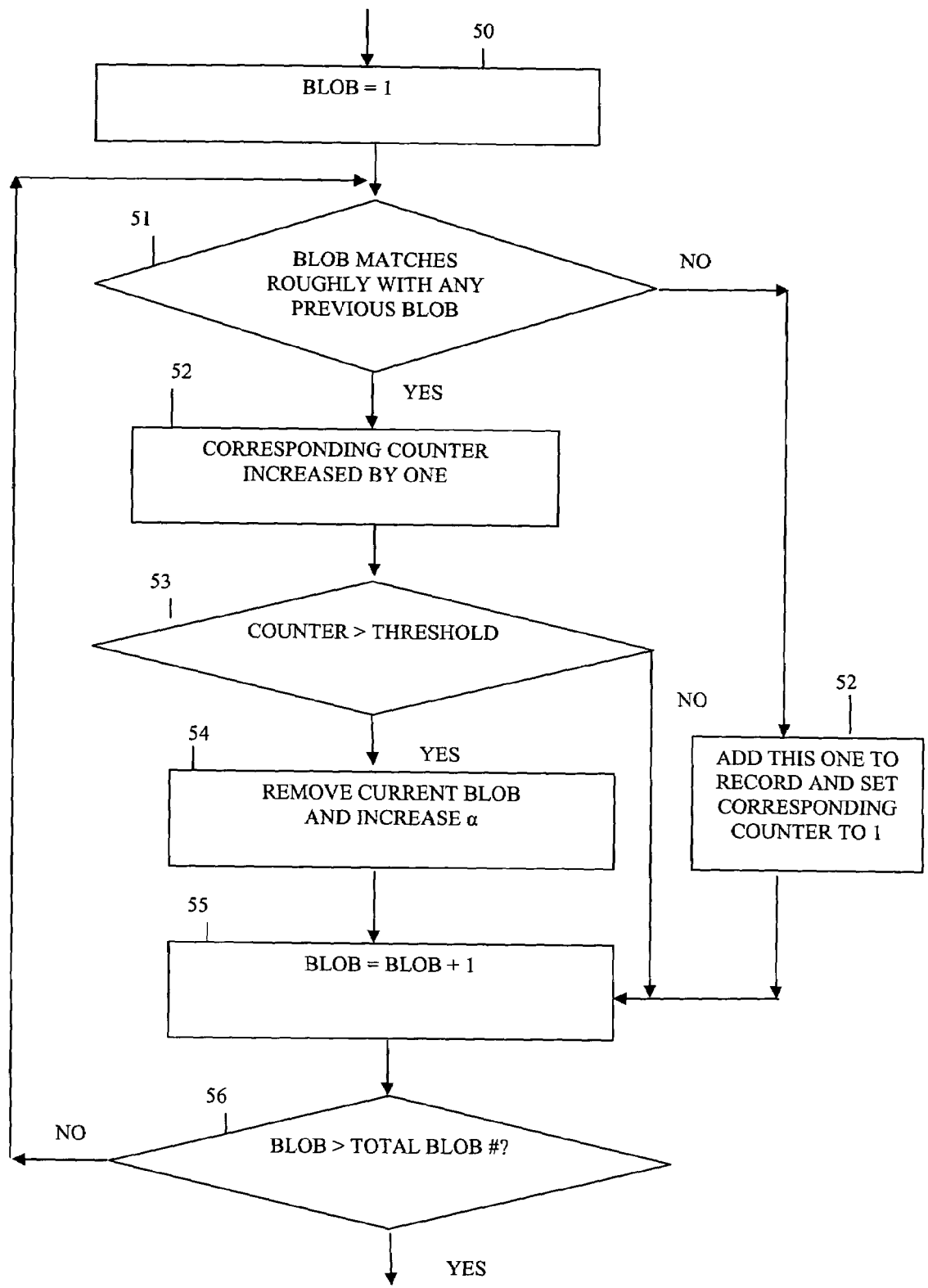
FIG. 6 is a flow diagram of a method for handling sudden local illumination and moved background objects.

FIG. 6 illustrates an embodiment for implementing block 26 for detecting and handling sudden local illumination change and moved background objects by removing blobs. The first blob is handled in block 50.

In block 51, it is determined if the blob matches roughly with any previous blob. To enable a blob matching process, a history record is always kept and updated. The record can be in the form of a data structure for keeping a history of accumulated numbers of how many frames contain the unchanged object. An example data structure can be in the form of a N×4 matrix as follows:

$$\begin{bmatrix} size_1 & centroid\_r_1 & centroid\_c_1 & accumul_1 \\ size_2 & centroid\_r_2 & centroid\_c_2 & accumul_2 \\ \vdots & \vdots & \vdots & \vdots \\ size_N & centroid\_r_N & centroid\_c_N & accumul_N \end{bmatrix}$$

N rows correspond to N separate detected objects in the previous frame. A separate detected object means it is not 8-connected. The first 3 elements of each row are the size, the row and column indices of the centroid of the corresponding object, respectively. The last element is the counter of how many times the object appears in the same location with the same size.

If an object is detected but does not match any previous detection, it is likely to be an entering object. Then the blob is added to a record and a corresponding counter is set to 1, in block 52. If it is determined that the blob matches roughly with a previous blob, the corresponding counter, accumul, is increased by 1, in block 52. In block 53, it is determined if the counter is greater than a predefined threshold k. If it is determined that the counter goes to the predefined threshold k, the blob is regarded as part of the background and the blob is removed, in block 54. The value of the learning parameter α is also increased, in block 22, referring to FIG. 3. Referring to FIG. 5, in block 55, the blob counter is increased by 1. If it is determined that the accumulative counter is not greater than the threshold in block 53, the blob counter is increased by 1, in block 55. Accordingly, if a foreground blob does not change for k frames, it is made part of the background.

In block 56, it is determined if all the blobs have been processed. If the blob counter is not greater than the total number of blobs, blocks 51 through 56 are repeated. For determining subsequent blobs, if the blob counter is greater than the total number of blobs, the method is completed.

Figure 7A:
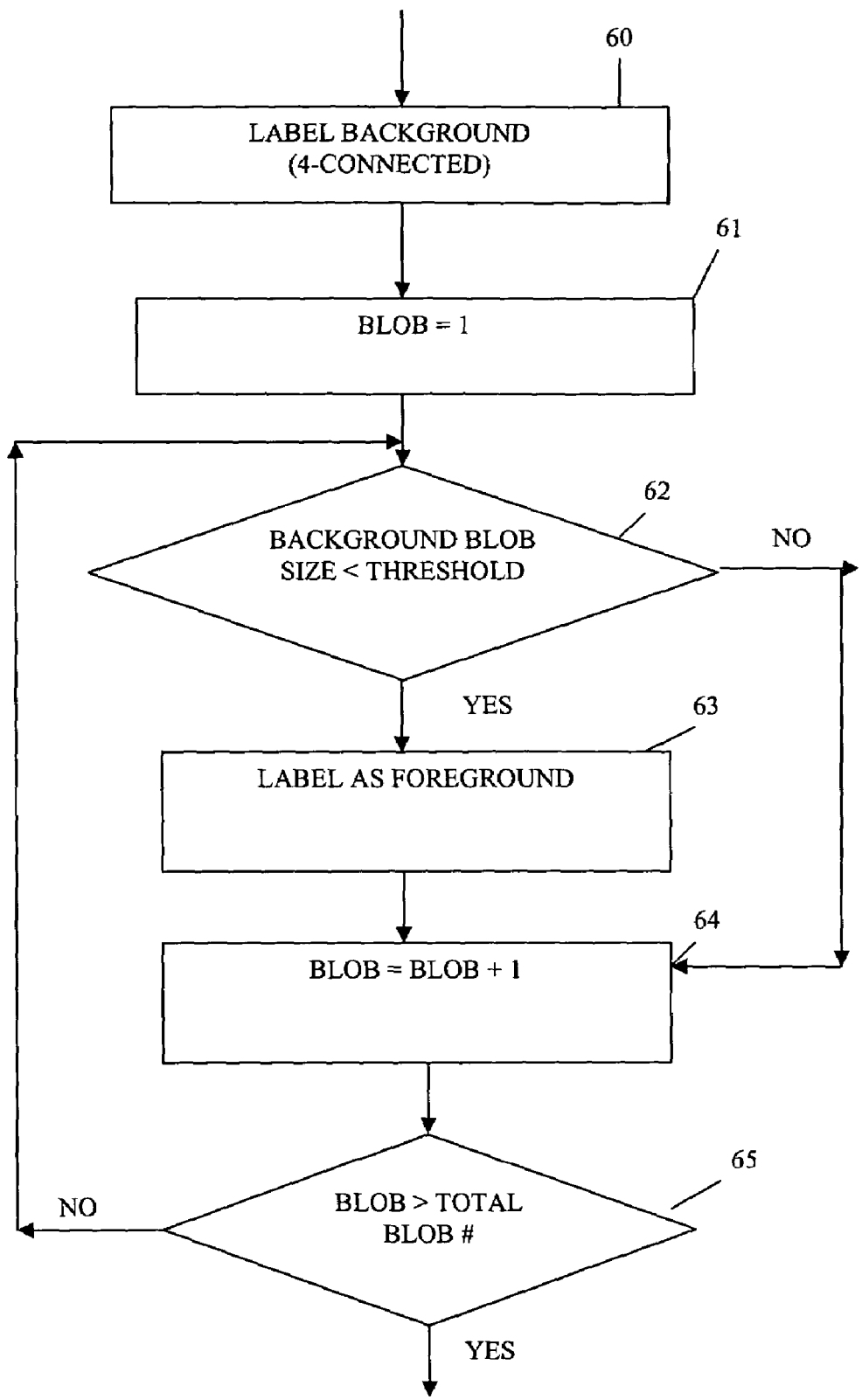
FIG. 7A is a flow diagram of an embodiment of a method for filling.
Figure 7B:
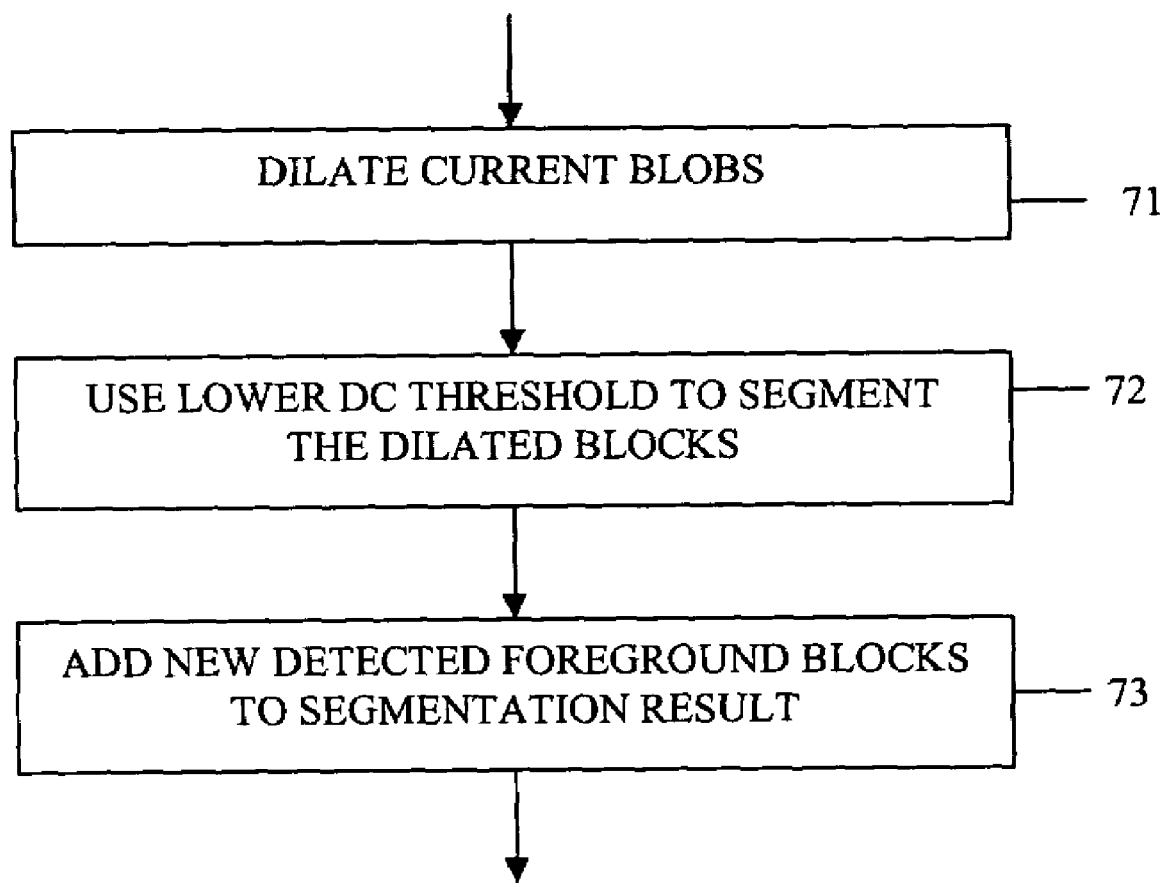
FIG. 7B is a flow diagram of an alternative embodiment of a method for filling.
Figure 7C:
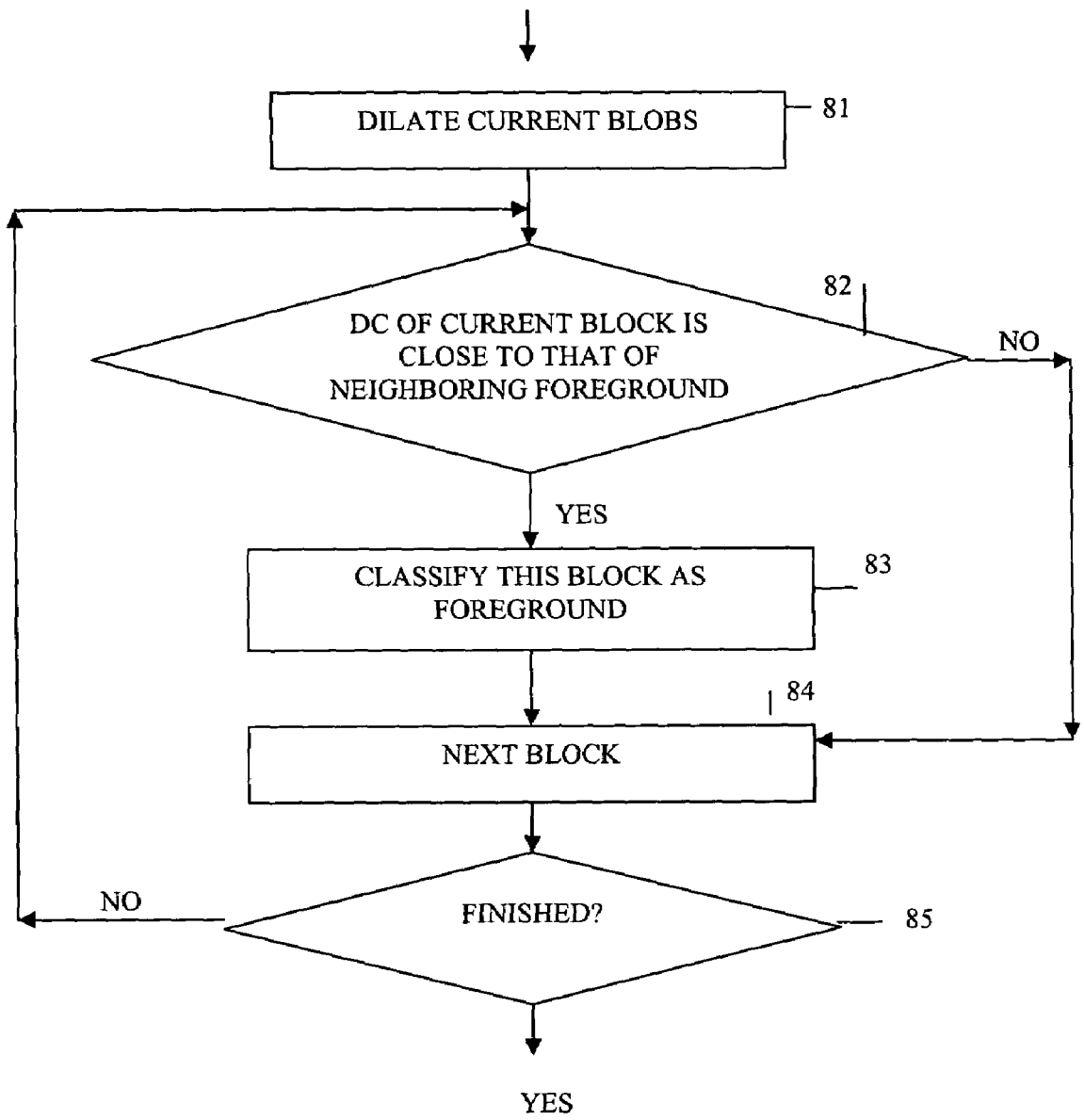
FIG. 7C is a flow diagram of an alternative embodiment of a method for filling.

Referring to FIG. 3, block 28 can be optionally implemented. Filling can be used to reduce false negatives such as those caused by camouflage. FIGS. 7A through 7C illustrate possible implementation of filling methods which can be used alone or in combination.

FIG. 7A illustrates a morphological filling method. It is based on the observation that most interesting objects are compact. In block 60, the background is a connected labeled. For example, a 4-connected label can be used. In block 61, the first background blob is chosen to be dealt with. It is determined if a background blob size is less than a threshold value, in block 62. If it is determined that the background blob size is less than the threshold value, the blob is labeled as foreground, in block 63. In block 64, the next blob is dealt with. If it is determined that the background blob size is not less than the threshold value, then the next blob is dealt with, in block 64. In block 65, it is determined if all the blobs have been processed. If the blob counter is not greater than the total number of blobs, blocks 61 through 64 are repeated. For determining subsequent blobs, if the blob counter is greater than the total number of blobs, the method is completed.

FIG. 7B illustrates an alternative filling method in which false negatives are reduced by decreasing the decision threshold for blocks that are close to the detected foreground objects. In block 71, current blobs are dilated. For example, the current blob can be dilated to include one or more surrounding blocks. In block 72, a lower DC threshold than the DC threshold described above, is used to segment the dilated blocks. For example, the DC threshold can be half of the original threshold. In block 73, the new detected foreground blocks are added to the segmentation result determined before.

FIG. 7C illustrates an alternative filling method in which false negatives are reduced by adding blocks having similar DC features to neighboring blocks belonging to the detected objects. In block 81, current blobs are dilated. It is determined if the DC feature of a current block is close to that of a neighboring foreground block, in block 82. If it is determined that the DC feature of the current block is close to the neighboring foreground block, the block is classified as foreground, in block 83. The next block is dealt with in block 84. Block 85 is performed to repeat blocks 82 through 84 until all neighboring blocks have been evaluated.

Experimental Results

The method was tested on several sequences of images under different lighting conditions, which represent almost all the difficulties encountered in segmentation. The same thresholds are used for all four sequences, except for the first sequence which uses a different threshold for size filtering due to the presence of very small objects in the scene. The background model was updated for each frame, although in a real implementation, the background can be updated much less frequently, say once every 100-200 frames. On a PIII 1 GHz processor, the present method can process about 36 frames per second with the frame size of 352×240 pixels. The first sequence contains a car and people in an outdoor setting. Object sizes vary considerably and there is occlusion. In the segmentation results, there is no foreground aperture problem that is typical for homogeneously colored cars, as shown in FIGS. 8A-8F.

The second sequence is also an outdoor setting, containing a cluttered background of trees, swaying branches, and a person wearing clothes with the color similar to the background. The swaying branches are detected as foreground only when they are shaken by the person. The segmentation results show that the method recovers instantaneously when the branches stop shaking, as shown in FIG. 9A-9F.

The third sequence features an indoor scene with a highly reflective wall in the background. A number of moving objects far away from the wall show up as (moving) reflections. The background contains a large area having colors very similar to the skin-tone, and there is a walking person wearing trousers with similar color to that of the background. The method gives very few false negatives and almost no false positives. Some sample frames are shown in FIGS. 10A-10F.

The fourth sequence is a very difficult test for foreground segmentation. The scene includes severe and frequent global and local illumination changes. There is strong lighting at some locations, some mirror-like background parts, and some cluttered background regions. The present invention produces good segmentation. Sample frames are shown in FIGS. 11A-11F.

In all four cases, the number of false positives and false negatives are low. Although sometimes false alarms appear due to a sudden lighting change, they do not persist. The present invention quickly learns to forget it.

The present invention uses only a single Gaussian model for the temporal evolution of the background, which leads to fast and effective adaptation. In general, the single Gaussian background model is quite sufficient to accommodate a gradual illumination change. With sudden lighting changes, the mixture of Gaussians (MoG) is slow to adapt. By way of contrast, in the present invention, the control over the learning process for the parameters of a single Gaussian distribution and the use of subsequent processing are able to simulate the effect of a MoG, while avoiding the slow adaptation of conventional MoG. When a sudden change happens, the change is detected first, and then a learning parameter is increased for fast learning and updating of the background model.

The present invention can be used as the front end processor for tracking and surveillance systems; for tracking to direct cameras to follow a particular person in a video conference setting; for monitoring and estimating traffic at railroad, bus stations, airports, highways; for monitoring parking areas, work areas or supermarkets; for monitoring threats; for low bandwidth adaptive video coding; and for applications where video sequences are processed by vision systems for motion detection and analysis. This list is by no means exhaustive.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for a foreground segmentation of a video sequence of at least one frame comprising the steps of:
    a. determining a background model from background model training;
    b. analyzing said at least one frame in said video sequence in a discrete cosine transform (DCT), said at least one frame is divided into a plurality of blocks;
    c. extracting one or more features of the analyzed at least one frame; and
    d. segmenting said at least one frame in said video sequence by determining if said one or more features satisfy a threshold value between said background model to provide a segmentation result of one or more foreground objects wherein a first said feature is a DC feature comprising a DC coefficient of said DCT and a second said feature is an AC feature comprising a weighted sum of DCT coefficients of said plurality of blocks.

2. The method of claim 1 wherein said weighted sum is determined with weights which are varied to emphasize different aspects of said video sequence.

3. The method of claim 1 wherein said AC feature is represented by $f_{AC}$ determined by:

$$f_{AC} = \sum_{i=0}^{3} \sum_{j=0}^{3} (i^2 + j^2) \cdot |DCT(i, j)|.$$

4. The method of claim 3 wherein in step d., said block is segmented as a foreground block if said block meets a first said threshold value based on a difference of said AC feature and a mean of said AC feature in the background model and/or a second said threshold value based on a difference of said DC feature and mean of said DC feature in said background model.

5. The method of claim 3 further comprising the step of:
updating said background model based on either said DC feature and/or said AC feature.

6. The method of claim 5 wherein the blocks of said background model are updated as follows:

$$\mu_t = (1-\alpha_\mu)\mu_{t-1} + \alpha_\mu \cdot x$$

$$\sigma_t^2 = (1-\alpha_\sigma)\sigma_{t-1}^2 + \alpha_\sigma \cdot (x-\mu_t)^2,$$

where t and t−1 are the frame numbers, x represents either the AC feature or the DC feature, and α is a learning parameter controlling the learning speed.

7. The method of claim 5 further comprising the steps of:
determining if a global change has occurred in a current said frame;
if a global change occurred, increasing the learning parameter which is used with said DC feature or said AC feature for updating said background model after step d.

8. The method of claim 7 wherein the learning parameter is increased by the steps of:
determining if the foreground objects were detected in a previous frame;
if no foreground objects were detected in step d., declaring the at least one frame as background in the background model and increasing said learning parameter; or
if foreground objects were detected in the previous frame, dilating the segmentation result and using the dilated segmentation result as a current segmentation result;
modeling illumination changes for the blocks of background blocks in the background model;
modeling a complete background model using interpolation and/or extrapolation;
re-segmenting a current frame in said video sequence by determining if one or more features of said current frame analyzed in the transform domain satisfy a threshold value between said background model; and
increasing the learning parameter.

9. The method of claim 5 wherein after step d., further comprising the steps of removing a false alarm by the step of size filtering.

10. The method of claim 9 wherein the step of size filtering is performed by the steps of:
e. determining if a blob size of a blob of the one or more foreground objects is less than a predetermined first threshold value;
f. if the blob size is less than the predetermined first threshold value, removing the blob;
g. if the blob size is greater than the first threshold value, determining if a ratio of a number of AC blocks representing the AC feature to a number of DC blocks representing the DC feature is less than a predetermined second threshold value;
h. if the ratio of the number of AC blocks to the number of DC blocks is less than the second threshold value, removing the blob; or
i. if the ratio of the number of AC blocks to the number of DC blocks is not less than the second threshold value, determining if the ratio of the number of AC blocks to the number of DC blocks is greater than a predetermined third threshold value; if a ratio of the number of AC blocks to the number of DC blocks is greater than the third threshold value, removing the blob, or if the ratio of the number of AC blocks to the number of DC blocks is not greater than the third threshold value, repeating steps e. through i. for all blobs.

11. The method of claim 5 wherein after step d., further comprising the step of:
detecting sudden local illumination changes or moved background objects; and updating said background model to remove false ones of said one or more foreground objects.

12. The method of claim 11 wherein said step of detecting sudden local illumination changes or moved background objects comprises the steps of:
e. determining if a blob of the foreground object matches roughly to a previous blob of the foreground object;
if the blob does not match roughly with the previous blob of the foreground object, adding the blob to a record and setting a corresponding counter to one or if the blob matches roughly to a previous blob of the foreground object increasing a corresponding counter by one;
f. determining if the counter is greater than a predefined threshold k;
g. if it is determined that the counter goes to the predefined threshold k, removing the blob and increasing a value of a learning parameter which is used for updating said background model after step d.; and
repeating steps e. through g. for all blobs.

13. The method of claim 5 wherein after step d., further comprising the step of filling said background model by the step of:
labeling blocks near said one or more foreground objects with similar features as said respective one or more said foreground objects.

14. The method of claim 13 wherein said filling step comprises the steps of:
e. labeling connected components of said background model;
f. determining if a blob size of the background model is less than a threshold value;
g. if it is determined that the blob size is less than the threshold value, labeling the blob as the foreground object;
repeating steps e. through g. for all blobs of the background model.

15. The method of claim 13 wherein said filling step comprises the steps of:
dilating blobs of the current frame to include one or more surrounding blocks; and
adding the surrounding blocks exceeding a DC threshold to the segmentation result.

16. The method of claim 13 wherein said filling step comprises the steps of:
e. determining if the DC feature of one of the blocks of the current frame is close to a neighboring block of respective one or more said foreground objects;
f. if it is determined that the DC feature of one of the blocks of the current frame is close to the neighboring foreground block, classifying the block as foreground; and
repeating steps e. through f. for all neighboring blocks.

17. The method of claim 1 wherein in step a., background model training comprises the step of:
estimating said background model from one or more features extracted from a training sequence, said features extracted from said training sequence being determined by analyzing said training sequence in a transform domain.

18. The method of claim 17 wherein said training sequence comprises one or more training frames of the video sequence, said training frames without foreground objects.

19. The method of claim 18 wherein in step a., said background model is determined as a Gaussian distribution with mean μ and variance $\sigma^2$ of said one or more features estimated from said training sequence.

20. The method of claim 19 wherein initial values of said mean μ and variance $\sigma^2$ of said one or more features are determined using a Maximum Likelihood Estimation.

21. The method of claim 18 wherein in step a., said background model is determined with mean μ and variance $\sigma^2$ of said one or more features estimated from said training sequence.

22. The method of claim 21 wherein initial values of said mean μ and variance $\sigma^2$ of said one or more features are determined using a Maximum Likelihood Estimation.

23. The method of claim 1 wherein in step a., said background model training comprises determining said background model from one or more features extracted from one or more frames in said video sequence.

24. The method of claim 23 wherein in step a., said background model is determined as a Gaussian distribution with mean μ and variance $\sigma^2$ of said one or more features estimated from said training sequence extracted from one or more frames in said video sequence.

25. The method of claim 23 wherein in step a., said background model is determined with mean μ and variance $\sigma^2$ of said one or more features estimated from said training sequence extracted from one or more frames in said video sequence.

26. A system for foreground segmentation of a video sequence of at least one frame comprising:
   means for determining a background model from background model training;
   means for analyzing said at least one frame in said video sequence in a transform wherein said transform is the discrete cosine transform (DCT) domain said at least one frame is divided into a plurality of blocks;
   means for extracting one or more features of the analyzed at least one frame; and
   means for segmenting said at least one frame in said video sequence by determining if one or more features satisfy a threshold value between said background model to provide a segmentation result of one or more foreground objects wherein a first said feature is a DC feature comprising a DC coefficient of said DCT and a second said feature is an AC feature comprising a weighted sum of DCT coefficients of said plurality of blocks.

27. The system of claim 26 wherein said weighted sum is determined with weights which are varied to emphasize different aspects of said video sequence.

28. The system of claim 26 wherein said AC feature is represented by $f_{AC}$ determined by:

$$f_{AC} = \sum_{i=0}^{3} \sum_{j=0}^{3} (i^2 + j^2) \cdot |DCT(i,j)|.$$

29. The system of claim 28 wherein said block is segmented as a foreground block if said block meets a first said threshold value based on a difference of said AC feature and a mean of said AC feature in the background model and/or a second said threshold value based on a difference of said DC feature and mean of said DC feature in said background model.

30. The system of claim 28 further comprising:
   means for updating said background model based on either said DC feature or said AC feature and a learning parameter.

31. The system of claim 30 wherein the blocks of said background model are updated as follows:

$$\mu_t = (1-\alpha_\mu)\mu_{t-1} + \alpha_\mu \cdot x$$

$$\sigma_t^2 = (1-\alpha_\sigma)\sigma_{t-1}^2 + \alpha_\sigma \cdot (x-\mu_t)^2,$$

where t and t−1 are the frame numbers, x represents either the AC feature or the DC feature, and α is a learning parameter controlling the learning speed.

32. The system of claim 31 further comprising:
   means for determining if a global change has occurred in said current frame;
   if a global change occurred, increasing the learning parameter which is used with said DC feature or said AC feature for updating said background model.

33. The system of claim 32 wherein the learning parameter is increased by:
   means for determining if the foreground objects were detected in a previous frame;
   if no foreground objects were detected, means for declaring the at least one frame as background in the background model and increasing said learning parameter; or
   if foreground objects were detected in the previous frame, means for dilating the segmentation result and using the dilated segmentation result as a current segmentation result;
   means for modeling illumination changes using the blocks of background blocks in the background model;
   means for modeling a complete background model using interpolation and/or extrapolation;
   means for re-segmenting a current frame in said video sequence by determining if one or more features of said current frame analyzed in the transform domain satisfy a threshold value between said background model; and
   means for increasing the learning parameter.

34. The system of claim 33 wherein size filtering is performed by:
   means for determining if a blob size of a blob of the one or more foreground objects is less than a predetermined first threshold value;
   if the blob size is less than the predetermined first threshold value, means for removing the blob; or
   if the blob size is greater than the first threshold value, means for determining if a ratio of a number of AC blocks representing the AC feature to a number of DC blocks representing the DC feature is less than a predetermined second threshold value; or
   if the ratio of the number of AC blocks to the number of DC blocks is less than the second threshold value, means for removing the blob; or
   if the ratio of the number of AC blocks to the number of DC blocks is not less than the second threshold value, means for determining if the ratio of the number of AC blocks to the number of DC blocks is greater than a predetermined third threshold value; if a ratio of the number of AC blocks to the number of DC blocks is not greater than the third threshold value, means for removing the blob, or if the ratio of the number of AC blocks to the number of DC blocks is not greater than the third threshold value means for repeating said size filtering for all blobs.

35. The system of claim 30 further comprising means for removing a false alarm by size filtering.

36. The system of claim 30 further comprising:
means for detecting sudden local illumination changes or moved background objects; and means for updating said background model to remove false ones of said one or more foreground objects.

37. The system of claim 36 wherein said means for detecting sudden local illumination changes or moved background objects comprises:
means for determining if a blob of the foreground object matches roughly to a previous blob of the foreground object;
if the blob does not match roughly with the previous blob of the foreground object, means for adding the blob to a record and setting a corresponding counter to one or if the blob matches roughly to a previous blob of the foreground object, means for increasing a corresponding counter by one;
means for determining if the counter is greater than a predefined threshold k;
if it is determined that the counter goes to the predefined threshold k, means for removing the blob and increasing a value of a learning parameter which is used for updating said background model.

38. The system of claim 30 further comprising means for filling said background model by labeling blocks near said one or more foreground objects with the same value as said respective one or more said foreground objects.

39. The system of claim 38 wherein said means for filling comprises:
means for labeling connected components of said background model;
means for determining if a blob size of the background model is less than a threshold value;
if it is determined that the blob size is less than the threshold value, means for labeling the blob as the foreground object.

40. The system of claim 38 wherein said filling comprises:
means for dilating blobs of the current frame to include one or more surrounding foreground blocks; and
means for adding the surrounding blocks exceeding a DC threshold to the segmentation result.

41. The system of claim 38 wherein said means for filling comprises:
means for determining if the DC feature of one of the blocks of the current frame is close to a neighboring block of respective one or more said foreground objects; and
if it is determined that the DC feature of one of the blocks of the current frame is close to the neighboring foreground block, means for classifying the block as foreground.

42. The system of claim 26 wherein said background model training comprises:
means for estimating said background model from one or more features extracted from a training sequence, said features extracted from said training sequence being determined by analyzing said training sequence in a transform domain.

43. The system of claim 42 wherein said training sequence comprises one or more training frames of the video sequence, said training frames without foreground objects.

44. The system of claim 43 wherein said background model is determined as a Gaussian distribution with mean $\mu$ and variance $\sigma^2$ of said one or more features estimated from said training sequence.

45. The system of claim 44 wherein initial values of said mean $\mu$ and variance $\sigma^2$ of said one or more features are determined using a Maximum Likelihood Estimation.

46. The system of claim 43 wherein said background model is determined with mean $\mu$ and variance $\sigma^2$ of said one or more features estimated from said training sequence.

47. The system of claim 46 wherein initial values of said mean $\mu$ and variance $\sigma^2$ of said one or more features are determined using a Maximum Likelihood Estimation.

48. The system of claim 26 wherein said background model training comprises means for determining said background model from one or more features extracted from a one or more frames in said video sequence.

49. The system of claim 26 wherein said background model is determined as a Gaussian distribution with mean $\mu$ and variance $\sigma^2$ of said one or more features estimated from said training sequence extracted from one or more frames in said video sequence.

50. The system of claim 26 wherein said background model is determined with mean $\mu$ and variance $\sigma^2$ of said one or more features estimated from said training sequence extracted from one or more frames in said video sequence.

* * * * *